United States Patent Office 3,371,352
Patented Mar. 5, 1968

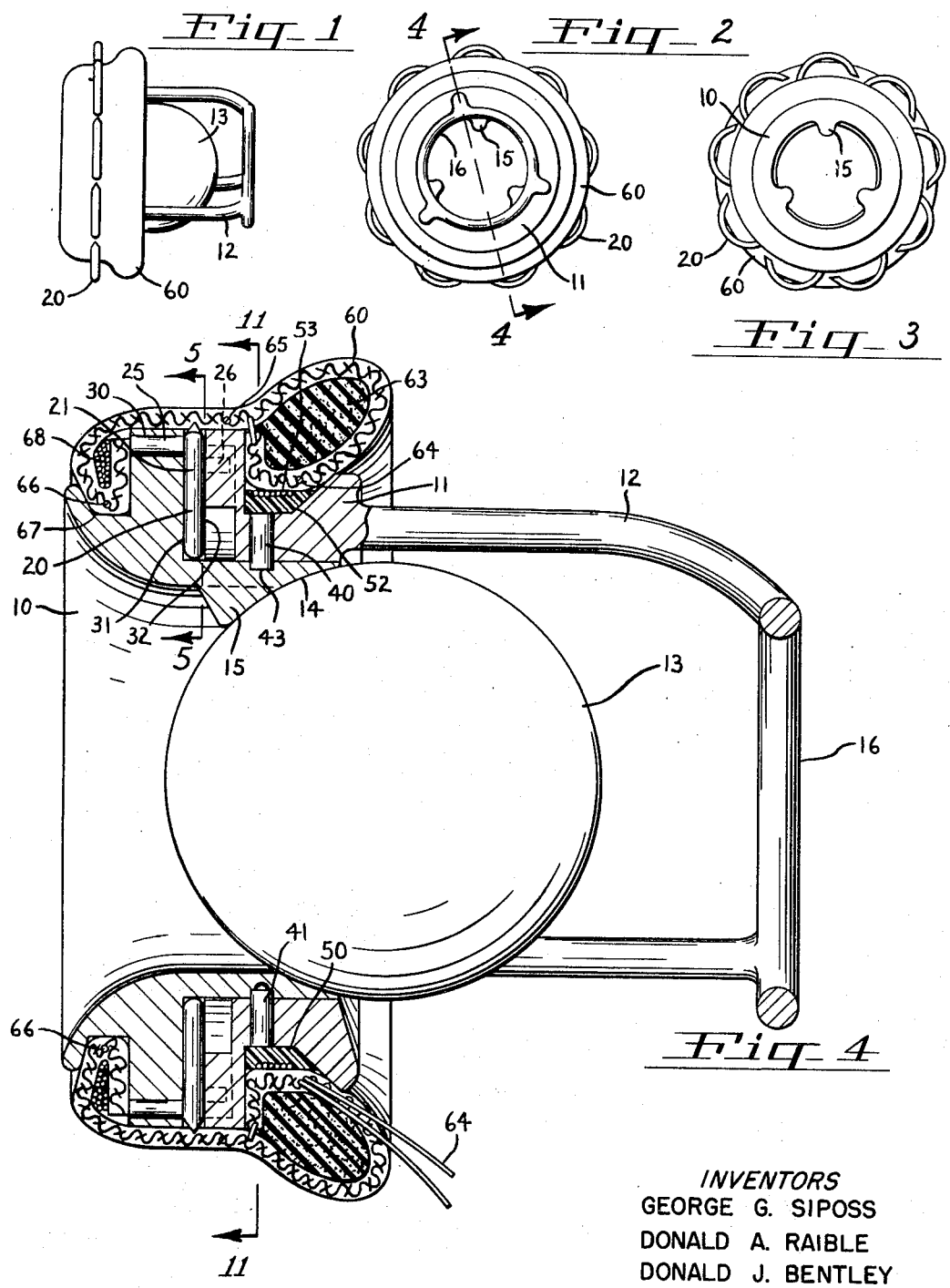
INVENTORS
GEORGE G. SIPOSS
DONALD A. RAIBLE
DONALD J. BENTLEY
ALBERT STARR
MILES LOWELL EDWARDS
BY
Attorney

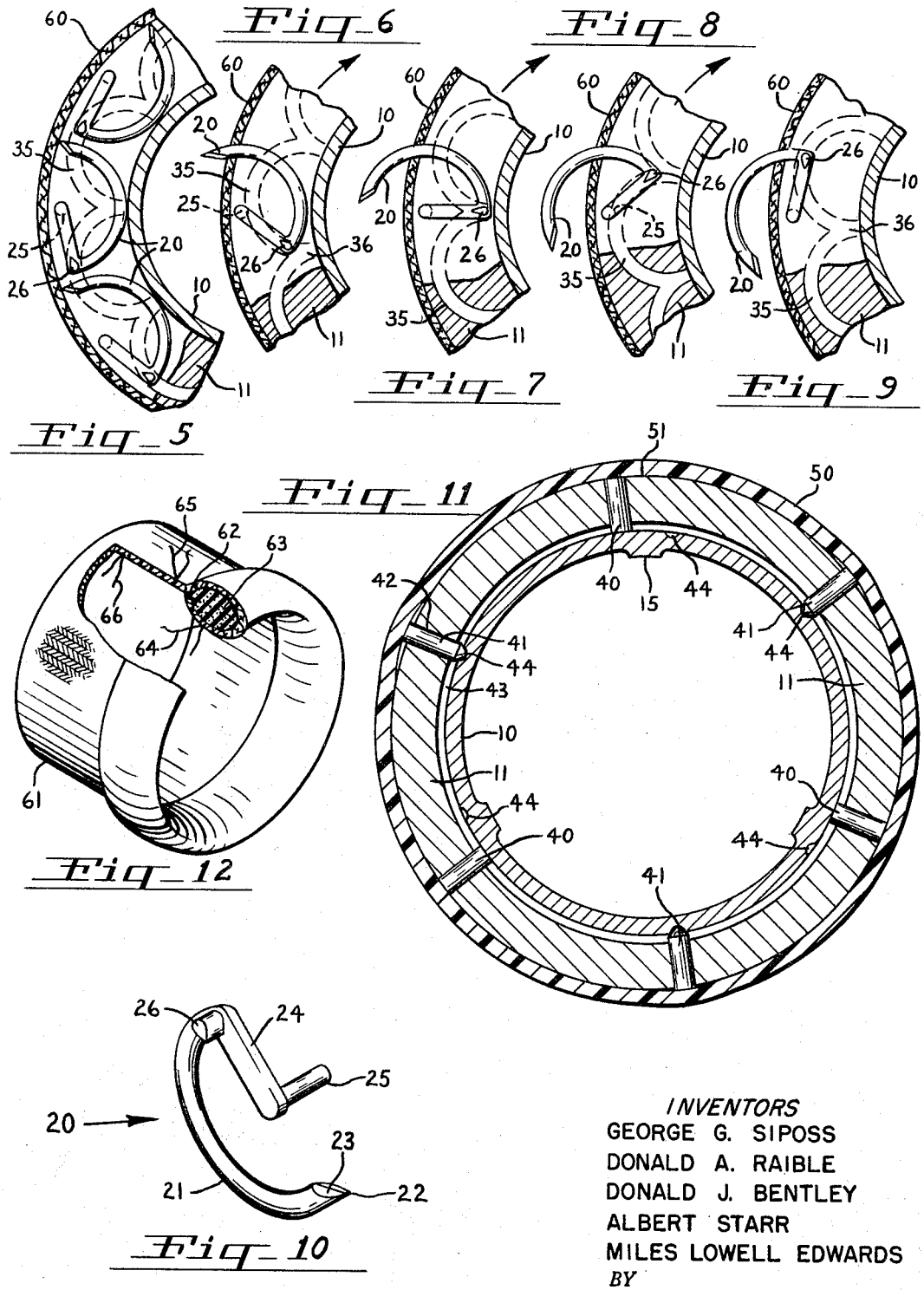

3,371,352
HEART VALVE FOR QUICK IMPLANTATION HAVING PROVISION FOR INGROWTH OF TISSUE
George G. Siposs, Garden Grove, Donald A. Raible, Corona, and Donald J. Bentley, Newport Beach, Calif., Albert Starr, Portland, Oreg., and Miles Lowell Edwards, Santa Ana, Calif., assignors to Edwards Laboratories, Inc., Santa Ana, Calif., a corporation of California
Filed Jan. 19, 1965, Ser. No. 426,613
18 Claims. (Cl. 3—1)

ABSTRACT OF THE DISCLOSURE

A heart valve having needle fixation in combination with an upholstered suturable cuff. The needles are pivotally mounted to swing in a common radial plane and have arcuately curved shanks concentric with their pivotal axes to avoid a sweeping motion as they penetrate the patient's tissue. The needles are projected by an epicycloidal cam on a rotatable ring in the valve.

---

This invention relates to improvements in a heart valve prosthesis.

The general object of the invention is to provide an easily implantable valve which combines the speed of mechanical fixation and the flexibility and proven safety of suture fixation. A more particular object is to provide a valve which may be attached to the heart without the use of sutures, with relatively few sutures or with many sutures depending upon the needs of the individual case. Suturing is a tedious and time-consuming operation, a large number of sutures requiring prolonged cardiopulmonary by-pass and hypothermia which has potential deleterious effect on the blood.

Other objects are to provide a valve having surgical needle fixation means, to provide an efficient mechanism for protruding and retracting the fixation needles, to provide a shape and arrangement of fixation needles which subjects the tissue to a minimum amount of damage, to provide suturing means in combination with needle fixation, to provide means for ingrowth of tissue, to provide an upholstered cuff and to provide a vehicle for medicaments such as anticoagulant and antibiotic drugs.

The present valve has two rings which are relatively rotatable to project and retract the fixation needles. The needles are curved in circular arcs and are mounted for pivotal movement on axes at the centers of the arcs so that there is no sweep in the movement of the needles to tear or damage the tissue beyond simple piercing action. The valve also has an upholstered cuff which provides a seal, a means for additional fixation by sutures when necessary, a vehicle for medicaments, and a medium for the ingrowth of tissue. An aortic valve is illustrated by way of example but certain features of the invention may be utilized in valves for other positions such as the mitral valve, tricuspid valve or pulmonic valve.

The invention will be better understood and the foregoing and other objects will become apparent from the following description of the preferred embodiment illustrated in the accompanying drawings. Various changes may be made, however, in the details of construction and arrangement of parts and certain features may be employed without others. All such modifications within the scope of the appended claims are included in the invention.

In the drawings:
FIGURE 1 is a side elevation view of an aortic valve embodying the features of the invention;
FIGURE 2 is a top plan view of the valve with the ball removed;
FIGURE 3 is a bottom plan view;
FIGURE 4 is a longitudinal sectional view approximately on the line 4—4 of FIGURE 2;
FIGURE 5 is an enlarged fragmentary view on the line 5—5 of FIGURE 4;
FIGURES 6–9 are a sequence of views similar to FIGURE 5 showing the rotation of a fixation needle as it is being extended to operative position;
FIGURE 10 is a perspective view of one of the fixation needles;
FIGURE 11 is a cross sectional view on the line 11—11 of FIGURE 4 with parts omitted, showing the holding pins and indexing pins; and
FIGURE 12 is a perspective view with parts broken away, showing the cloth sleeve which forms the cuff.

Referring first to FIGURE 4, the valve comprises a metal seat ring 10 and a metal cage ring 11. The ring 11 carries an integral cage 12 on its downstream side to retain a silicone rubber ball 13 which seats on a spherical surface 14 in the ring 10. In order to make the valve orifice as large as possible and still prevent any possibility of the ball squeezing through the opening in its seat ring, the latter is provided with three inward projections 15. The cage 12 has a ring 16 interconnecting and integral with the three legs of the cage. The ring 16 provides an opening to receive an implanting tool as will be presently described. All of the metal parts of the valve are made of a strong and non-corrodable material such as Stellite and all such parts are preferably cast.

A plurality of identical fixation needles 20 are mounted and arranged for projection and retraction by the relative rotation of cage ring 11 on seat ring 10. One of the needles 20 is shown in perspective in FIGURE 10. The needle shank 21 which pierces the tissue has an arcuate curvature almost 180° in length in one plane. A sharp point 22 is formed by two bevelled surfaces at 23 facing inward and extending from the inner to the outer side of the needle so that the point will be on the outer side of the needle as in surgical needles. The opposite end of the shank is connected with a radial arm 24 on a pivotal shaft portion 25 at the center of curvature of the arcuate shank portion 21. Shaft portion 25 extends in an axial direction from the plane of the curved portion 21. A teardrop shaped drive arm 26 extends in the opposite direction from the opposite end of radial arm 24.

Referring back to FIGURE 4, seat ring 10 contains around its periphery a series of axially directed cylindrical bores 30 which form bearings for the shaft portions 25 of the individual needles 20. The curved shanks 21 of the needles are adapted to rotate in a space between a radial surface 31 on seat ring 10 and a confronting radial surface 32 on cage ring 11.

Referring now to FIGURE 5, the drive arm 26 forms a cam follower in an epicycloidal cam groove 35 in cage ring 11. In FIGURE 5 the needles are fully retracted with each drive arm 26 at the crest of a different loop of the cam groove. The groove has a number of such loops equal to the number of needles. As cage ring 11 is rotated clockwise in FIGURES 6 and 7 relative to the stationary seat ring 10, the drive arm 26 progresses down to the cusp 36 of the groove 35, rotating the needle approximately 90° counterclockwise. Further rotation of the cage ring causes the drive arm 26 to follow the next loop of the groove and continue the rotation of the needle. The teardrop shape of the drive arm guides it effectively from the one loop to the next as the drive arm passes through the cusp of the groove.

Finally, when the cage ring has been rotated to the FIGURE 9 position, drive arm 26 has progressed to the crest of the next loop of the groove, resulting in needle rotation of approximately 180°. This brings the point of the needle back almost in contact with the seat ring, encircling a body of tissue adjacent the ring for fixation of the valve. During the movement from FIGURE 5 to FIGURE 9, the cage ring rotates a distance equal to twice the distance between the crests of two successive loops of the groove.

It is to be noted that during this movement of the needle there is no sweep of the shank portion 21 of the needle to tear or damage the tissue except for the mere penetration of the tissue. All parts of the shank follow the point in a curved path conforming to the curvature of the shank. This is the motion of a suture needle manipulated by a skilled surgeon. All the other needles around the ring execute the same movement simultaneously with the needle illustrated, all the needles being projected in a common radial plane.

The seat ring 10 and cage ring 11 are held together in assembled relation by three radial holding pins 40 and three radial indexing pins 41 as shown in FIGURES 4 and 11. These pins are mounted for longitudinal movement in radial bores 42 in the cage ring. The inner ends of the pins project into an annular groove 43 in the seat ring. The indexing pins are longer than the holding pins and have pointed ends adapted to seat in a plurality of depressions 44 in the bottom of the groove. These depressions are located to index the cage ring in its FIGURE 5 position with the pins retracted and in its FIGURE 9 position with the pins extended.

The pins 40 and 41 are retained in their bores 42 by a surrounding plastic ring 50 which is split at 51 for application to an external groove 52 in the cage ring 11. The ring 50 is secured in place by a circumferential winding 53 of Teflon thread or the like in a shallow channel in its outer surface. The ring 50 presses the points of indexing pins 41 against the bottom of channel 43 and holds them in indexed positions in the depressions 44 but has sufficient resilience to permit these pins to move out radially when they are forced out of these depressions by rotation of the cage ring. Thus, the plastic ring 50 serves as a retainer for all the pins and operates as a spring element for the indexing pins 41.

The valve is equipped with an upholstered cuff 60. This cuff comprises a sleeve 61 of knitted or woven synthetic fiber such as Teflon, as shown in FIGURE 12. One end of the sleeve is doubled back inside and stitched at 62 to enclose a cushion ring 63 of a suitable material such as silicone foam rubber. The inside portion of the sleeve is provided with a draw string 64 adjacent this cushion ring and additional draw strings 65 and 66 are provided in mid and opposite end portions of the sleeve as shown.

In applying the sleeve to the valve, it is turned inside out and extended to the left in FIGURE 4 with the draw string 66 disposed in an outwardly facing channel 67 around the seat ring 10 close to its upstream side. This draw string is tightened and tied and then a winding 68 of Teflon thread or the like is applied over the end portion of the sleeve to hold it securely in the channel. Then the end of the sleeve containing cushion ring 63 is turned back over cage ring 11 in a position to rest on the winding 53 in groove 52. The sleeve is secured in this position by tightening and tying draw strings 64 and 65. Thus, the cage ring is free to rotate within the cuff and the needles 20 will pierce the cuff when they are extended.

If the valve is implanted without any sutures at all, the cuff provides a resilient seal against the inner wall of the aorta and the sleeve material provides a medium for the ingrowth of tissue. In addition, the silicone rubber cushion ring 63 provides a vehicle for a medicament if desired. Silicone rubber has the capacity to absorb anticoagulant drugs such as heparin, and antibiotics and exude the drugs slowly over a long period of time while healing its progressing. This characteristic of silicone rubber is not possessed by the Teflon material of the sleeve 61. In order to facilitate ingrowth into the cushion ring 63, this ring may have a sponge-like texture with visible openings but such open structure is not necessary for the purpose of providing a vehicle for medicament. The medicament is absorbed into the body of the rubber and is not held in any sponge-like openings that may be present.

Usually the implantation is facilitated by using a small number of guiding sutures to guide the valve into position. Such sutures through the cushion ring 63 then provide means of fixation in addition to the needles 20. Also, in a case where the aorta may have a somewhat irregular shape, sutures may be applied wherever necessary to conform the cuff to the shape of the aorta and make a good seal. The present cuff arrangement provides these opportunities while at the same time the needle fixation obviates the necessity for as large a number of sutures as would otherwise be necessary. This reduces the time required for the operation and makes the valve adaptable to unusual conditions which may be encountered in the operation.

The cushion ring is flexible and resilient and responds to dilations and contractions of the aorta with the pulsations of the heart after implantation has been accomplished. This assures maintenance of the sealing function of the cuff and also facilitates ingrowth by allowing the cuff to move with the aorta wall. Since the cuff is cup-shaped, any back pressure of blood in the aorta tends to expand the end of the cuff and enhance the seal.

Cushion ring 63 may have a sealed surface completely enclosing the bubbles in the foam rubber, when a number of sutures are to be used. The puncturing of the rubber by the sutures provides opportunity for ingrowth at the suture points.

The valve is implanted with a tool having an inner part insertable through the end ring 16 to grip the seat ring 10 and a rotatable outer part to turn the cage ring 11 for projecting the needles 20. When the tool is removed, the ball may be squeezed in between the legs of the cage.

Although only an aortic valve is illustrated, certain features of the valve are useful in other positions as hereinabove mentioned. In any case, the needle operating mechanism does not pinch or damage the tissue in any way.

Having now described our invention and in what manner the same may be used, what we claim as new and desire to protect by Letters Patent is:

1. A heart valve comprising a valve ring having a movable valve member, a plurality of fixation needles mounted for protrusion and retraction relative to said ring, means for protruding and retracting said needles, detent indexing means for said last means, and an upholstered cuff surrounding and secured to said valve ring.

2. A heart valve comprising relatively rotatable seat and cage rings, a cage on said cage ring, a movable valve member in said cage arranged to seat in said seat ring, a plurality of needles pivotally mounted in said rings for projection by said relative rotation of the rings, said needles having arcuately curved shanks concentric with their pivotal axes, and a suturable cuff secured to said seat ring and overlying said cage ring.

3. A heart valve comprising a pair of rings connected together for relative rotation, a movable valve member mounted in said rings, a plurality of needles pivotally mounted for projection from said rings in a common radial plane by relative rotation of the rings, said needles having arcuately curved shanks concentric with their pivotal axes, and a cuff comprising a cloth sleeve, one end of said sleeve being secured to one of said rings and the other end of said sleeve surrounding the other ring.

4. A heart valve having an upstream side and downstream side, said valve comprising a seat ring extending to the upstream face of the valve, an outwardly facing channel around said seat ring adjacent said upstream face, a cage ring mounted for rotation on said seat ring in a position downstream from said channel, a cage on said cage ring, a movable valve member in said cage arranged to seat in said seat ring, a plurality of needles pivotally mounted in said rings for projection by rotation of said cage ring, said needles having arcuately curved shanks concentric with their pivotal axes, a cloth sleeve having one end secured in said channel, a rubber cushion ring surrounding said cage ring, and the opposite end of said sleeve being folded and secured around said cushion ring.

5. A heart valve having an upstream side and a downstream side, said valve comprising a seat ring extending to the upstream face of the valve, an outwardly facing channel around said seat ring adjacent said upstream face, a cage ring mounted for rotation on said seat ring in a position downstream from said channel, a cage on said cage ring, a movable valve member in said cage arranged to seat in said seat ring, a plurality of needles mounted in said rings for projection by rotation of said cage ring, a cloth sleeve having one end secured in said channel, a rubber cushion ring surrounding said cage ring, the opposite end of said sleeve being folded and secured around said cushion ring, a draw string in said one end of said sleeve disposed in said channel, and a draw string in said opposite end portion of said sleeve.

6. A heart valve comprising a seat ring, a cage ring mounted for rotation on said seat ring, a movable valve member mounted in said rings, a plurality of fixation needles pivotally mounted in said rings for protrusion and retraction in a common radial plane, said needles having arcuately curved shanks concentric with their pivotal axes, means operable by relative rotation of said rings to protrude and retract said needles, a cuff comprising a cloth sleeve, and means securing one end of said sleeve to said seat ring, the other end of said sleeve surrounding said cage ring, said needles being protrudable and retractable through said sleeve.

7. A heart valve comprising a seat ring, a cage ring surrounding a reduced portion of said seat ring, said cage ring being rotatable on said seat ring, a movable valve member mounted in said rings, a plurality of fixation needles pivotally mounted in said rings for protrusion and retraction, said needles having arcuately curved shanks concentric with their pivotal axes, means operable by relative rotation of said rings to protrude and retract said needles, a cuff comprising a cloth sleeve, means securing one end of said sleeve to said seat ring, a portion of said cage ring having a reduced outside diameter, the other end of said sleeve surrounding said cage ring, and a cushion ring secured in said other end of said sleeve and disposed around said reduced diameter portion of said cage ring.

8. A heart valve comprising a valve ring having a movable valve member, a plurality of needles pivotally mounted in said ring, means for projecting and retracting said needles, said needles having arcuately curved shanks concentric with their pivotal axes, and a point on each needle formed by a bevelled surface etxending from the inner to the outer side of said shank with the tip of the point on said outer side.

9. A heart valve comprising a valve ring having a movable valve member, a plurality of needles pivotally mounted in said ring, and means for projecting and retracting said needles, said needles having arcuately curved shanks concentric with their pivotal axes, said shanks lying in a common radial plane.

10. A heart valve comprising a pair of relatively rotatable concentric rings, a movable valve member mounted in said rings, a plurality of needles pivotally mounted in one of said rings, and means operable by relative rotation of the other ring for projecting and retracting said needles in a common radial plane, said needles having arcuately curved shanks concentric with their pivotal axes.

11. A heart valve comprising a pair of relatively rotatable concentric rings, a movable valve member in said rings, a plurality of needles pivotally mounted in one of said rings on axes parallel to the axis of the rings, cam followers on said needles, cam means on the other ring engaging said cam followers to project the needles from said rings by rotation of said other ring, and arcuately curved shanks on said needles concentric with their pivotal axes, all of said shanks lying in a common radial plane.

12. A heart valve comprising a pair of relatively rotatable concentric rings, a movable valve member mounted in said rings, a plurality of needles pivotally mounted in one of said rings, cam followers on said needles, an epicycloidal cam on said other ring engaging said cam followers to project the needles from said rings by rotation of said other ring, and arcuately curved shanks on said needles concentric with their pivotal axes.

13. A heart valve comprising a pair of relatively rotatable concentric rings, a movable valve member mounted in said rings, a plurality of needles pivotally mounted in one of said rings on axes parallel to the axis of the rings, an epicycloidal cam on said other ring having a number of loops equal to the number of needles, cam followers on said needles engaging the respective loops arranged to project the needles from said rings by rotation of said other ring, and arcuately curved shanks of said needles concentric with their pivotal axes, all of said shanks lying in a common radial plane.

14. A heart valve comprising a pair of relatively rotatable concentric rings, a movable valve member mounted in said rings, a plurality of axial bores in one of said rings, a plurality of needles having shaft portions mounted for rotation in said bores and having pointed shank portions arcuately curved concentric with said shaft portions, said shank portions being disposed in a common radial plane, a drive arm on each needle, and an epicycloidal cam groove in said other ring having a number of loops equal to the number of needles, one of said drive arms being disposed in each of said loops, rotation of said other ring in opposite directions extending and retracting said needles from and into said rings.

15. A heart valve comprising a pair of relatively rotatable concentric rings, a movable valve member mounted in said rings, a plurality of needles movably mounted in one of said rings, means operable by relative rotation of the other ring to protrude said needles from the rings and to retract said needles, radial pins holding said rings in assembled relation, radial indexing pins in one ring engageable with detents in the other ring arranged to index said rings in one relative position when the needles are retracted and in another relative position when the needles are protruded, and a resilient ring on one of said rotatable rings engaging said indexing pins to press said pins into said detents.

16. A heart valve comprising a pair of relatively rotatable concentric rings, a movable valve member mounted in said rings, a plurality of fixation needles movably mounted in one of said rings for protrusion and retraction, means operable by relative rotation of said rings to protrude and retract said needles, and detent means arranged to index the relative rotation of said rings in the protruded and retracted positions of said needles.

17. A heart valve comprising a seat ring, a cage ring rotatably mounted on said seat ring, a movable valve member mounted in said rings, a plurality of fixation needles having shaft portions rotatably mounted in bores in said seat ring, said needles having pointed shank portions of arcuate curvature concentric with said shaft portions, a drive arm on each needle, an epicycloidal groove in said cage ring engaging the drive arms of said needles to project and retract the needles simultaneously when the cage ring is rotated, an annular groove containing a plurality of depressions in said seat ring, pins mounted in radial bores in said cage ring with the inner ends of the pins disposed in said groove, a resilient ring around said cage ring engaging the outer ends of certain of said pins and pressing them resiliently into said depressions to index said cage ring in different rotative positions, an outwardly facing channel in said seat ring, a cuff comprising a sleeve of cloth, means securing one end of said sleeve in said channel, and a rubber cushion ring enclosed in an annular fold at the other end of said sleeve and surrounding said cage ring.

18. A heart valve comprising a valve ring having a movable valve member, a plurality of fixation needles mounted for projection from the periphery of said ring and retraction within the periphery of said ring, said needles having arcuately curved shanks of approximately 180° arcuate length, and means for projecting and retracting each needle in a circular path of movement about the center of curvature of its shank, substantially the full 180° length of said shank being projected from said ring in projected position.

References Cited

UNITED STATES PATENTS

| | | | |
|---|---|---|---|
| 2,869,550 | 1/1959 | Kurtz | 128—339 |
| 3,130,419 | 4/1964 | Edwards | 3—1 |
| 3,143,742 | 8/1964 | Cromie | 3—1 |
| 3,263,239 | 8/1966 | Edwards et al. | 3—1 |
| 3,279,996 | 10/1966 | Long et al. | |

OTHER REFERENCES

"Prosthetic Replacement of the Mitral Valve," Lancet, Nov. 24, 1962, page 1087.

"Sutureless Prosthetic Heart Valves," by Harry W. Cromie et al., Journal of Thoracic and Cardiovascular Surgery, vol. 46, No. 6, December 1963, pp. 726–736.

"Sutureless Aortic & Mitral Prosthetic Valves," Journal of Thoracic and Cardiovascular Surgery, vol. 48, September 1964, pp. 346–361.

RICHARD A. GAUDET, *Primary Examiner.*

R. L. FRINKS, *Assistant Examiner.*